United States Patent
Nakayama et al.

(10) Patent No.: US 9,810,885 B2
(45) Date of Patent: Nov. 7, 2017

(54) IMAGING-OPTICAL SYSTEM, STEREO CAMERA APPARATUS, AND IN-VEHICLE CAMERA APPARATUS

(71) Applicants: Takahiro Nakayama, Kanagawa (JP); Hiroshi Nakanuma, Kanagawa (JP)

(72) Inventors: Takahiro Nakayama, Kanagawa (JP); Hiroshi Nakanuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 262 days.

(21) Appl. No.: 14/631,216

(22) Filed: Feb. 25, 2015

(65) Prior Publication Data
US 2015/0253548 A1    Sep. 10, 2015

(30) Foreign Application Priority Data
Mar. 5, 2014   (JP) ................... 2014-042619

(51) Int. Cl.
*G02B 13/04* (2006.01)

(52) U.S. Cl.
CPC .................... *G02B 13/04* (2013.01)

(58) Field of Classification Search
CPC .... G02B 13/04; G02B 13/004; G02B 13/005; G02B 9/62; G02B 9/64; G02B 13/0045; G02B 9/04; G02B 9/06; G02B 9/08; G02B 9/10; G02B 9/12; G02B 9/14; G02B 9/16; G02B 9/18; G02B 9/20; G02B 9/34; G02B 9/36; G02B 9/60
USPC ....... 359/771–774, 776, 680, 682, 749, 751, 359/713–717, 754–758, 763–764, 750, 359/752, 753, 784, 785, 793–795
See application file for complete search history.

(56) References Cited

U.S. PATENT DOCUMENTS 7,492,524 B2 * 2/2009 Ito .................. G02B 27/646
                                                             359/34
2006/0104677 A1   5/2006 Saito et al.
(Continued)

FOREIGN PATENT DOCUMENTS

JP      1-134411     5/1989
JP      2005-62559   3/2005
(Continued)

OTHER PUBLICATIONS

U.S. Appl. No. 14/638,923, Mar. 4, 2015, Nakayama.
U.S. Appl. No. 14/638,923, filed Mar. 4, 2015.

*Primary Examiner* — Ricky Mack
*Assistant Examiner* — Kristina Deherrera
(74) *Attorney, Agent, or Firm* — Oblon, McClelland, Maier & Neustadt, L.L.P.

(57) ABSTRACT

A retro-focus type imaging-optical system is disclosed. The imaging-optical system comprises, in order from an object side to an image side a first lens group, an aperture stop, and a second lens group. The first lens group includes, in order from the object side, a positive first F lens group and a negative first R lens group. The first F lens group includes a positive meniscus lens having a convex surface on the object side. The first R lens group includes a negative meniscus lens having a convex surface on the object side and a positive lens. The second lens group includes, in order from the object side, a positive second F lens group and a second R lens group, and the second F lens group includes a positive lens element having a convex meniscus shape on the image side.

20 Claims, 5 Drawing Sheets

(56) References Cited

U.S. PATENT DOCUMENTS

| | | | |
|---|---|---|---|
| 2007/0059071 A1 | 3/2007 | Shinshi et al. | |
| 2007/0110464 A1 | 5/2007 | Nakayama et al. | |
| 2008/0112734 A1 | 5/2008 | Furuya et al. | |
| 2008/0118281 A1 | 5/2008 | Saeki et al. | |
| 2008/0187343 A1 | 8/2008 | Yamaguchi et al. | |
| 2009/0067065 A1 | 3/2009 | Suzuki et al. | |
| 2010/0027254 A1 | 2/2010 | Nakayama | |
| 2010/0296180 A1 | 11/2010 | Sudoh et al. | |
| 2011/0051260 A1 | 3/2011 | Nakayama et al. | |
| 2011/0141578 A1 | 6/2011 | Nakayama | |
| 2011/0150540 A1 | 6/2011 | Saeki et al. | |
| 2011/0176215 A1 | 7/2011 | Mouri et al. | |
| 2012/0250165 A1* | 10/2012 | Do | G02B 13/005 359/715 |
| 2013/0215321 A1 | 8/2013 | Nakayama | |
| 2013/0321936 A1* | 12/2013 | Ohashi | G02B 13/001 359/740 |
| 2014/0184845 A1 | 7/2014 | Nakayama | |

FOREIGN PATENT DOCUMENTS

| | | |
|---|---|---|
| JP | 2009-69369 | 4/2009 |
| JP | 2010-72051 | 4/2010 |
| JP | 2012-123122 | 6/2012 |
| JP | 2012-220741 | 11/2012 |

* cited by examiner

IMAGING-OPTICAL SYSTEM, STEREO CAMERA APPARATUS, AND IN-VEHICLE CAMERA APPARATUS

CROSS-REFERENCE TO RELATED APPLICATIONS

The present application is based on and claims priority from Japanese Patent Application Number 2014-042619, filed Mar. 5, 2014, the disclosure of which is hereby incorporated by reference herein in its entirety.

BACKGROUND OF THE INVENTION

Field of the Invention

The present invention relates to an imaging-optical system, a stereo camera apparatus, and an in-vehicle camera apparatus.

Description of the Related Art

Recently, various types of imaging apparatuses have been put into practical use, including not only a camera device for photographing but also an in-vehicle camera apparatus, a stereo camera apparatus, and a monitoring camera apparatus (refer to Patent Documents 1 to 5).

Patent Document 1: Japanese Patent Application Laid-Open Publication No. 2012-123122
Patent Document 2: Japanese Patent Application Laid-Open Publication No. H01-134411
Patent Document 3: Japanese Patent Application Laid-Open Publication No. 2010-072051
Patent Document 4: Japanese Patent Application Laid-Open Publication No. 2009-069369
Patent Document 5: Japanese Patent Application Laid-Open Publication No. 2012-220741

Generally, an imaging-optical system mounted on many types of imaging apparatuses is required to have a miniature body, a certain level of wide angle of view, and brightness with a better performance.

Obviously, it is preferable that various types of aberrations be corrected adequately when considering performance.

Generally, when the number of lenses configuring the imaging-optical system increases, parameter of the aberration correction also increases, and the aberration correction can be therefore performed successfully. However, the increase of the number of lenses causes an increase in the length of the imaging optical system.

SUMMARY OF THE INVENTION

The present invention has been made in view of the above and aims to provide a new imaging-optical system in which an increase in the length of the imaging-optical system can be prevented while a performance improvement is achieved.

The imaging-optical system in Embodiment 1 of the present invention is a retro-focus type imaging-optical system comprising, in order from an object side to an image side, a first lens group, an aperture stop, and a second lens group, wherein the first lens group includes, in order from the object side, a positive first F lens group and a negative first R lens group, the first F lens group includes a positive meniscus lens having a convex surface on the object side, the first R lens group includes a negative meniscus lens having a convex surface on the object side and a positive lens, the second lens group includes, in order from the object side, a positive second F lens group and a second R lens group, and the second F lens group includes a positive lens element having a convex meniscus shape on the image side.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENTS

Embodiment 1

Hereinafter, Embodiments of the present invention will be described. Four Examples of the imaging-optical system are shown in FIG. 1 to FIG. 4. Embodiment 1 corresponds to the later-described Example 1 to Example 4.

To make the description simpler, reference characters are commonly used in the figures.

In FIG. 1 to FIG. 4, the left side of the figure corresponds to an object side, and the right side of the figure corresponds to an image side.

These figures illustrate a condition in which a lens, a filter, and a cover glass of an imaging element are arranged on an optical axis.

In FIG. 1 to FIG. 4, the reference character 1G indicates a first lens group, the reference character S indicates an aperture stop, the reference character 2G indicates a second lens group, the reference character F indicates the filter, and the reference character CG indicates the cover glass of the imaging element.

The reference character Im indicates an image surface.

In each lens, the $i^{th}$ lens from the object side in the first lens group 1G is represented by the reference character L1$i$, and the $i^{th}$ lens from the object side in the second lens group 2G is represented by the reference character L2$i$.

The first lens group 1G includes, in order from the object side, a positive first F lens group 1FG and a negative first R lens group 1RG.

The first F lens group 1FG includes a positive meniscus lens L11 having a convex surface on the object side.

The first R lens group 1RG includes a negative meniscus lens L12 having a convex surface on the object side, and a positive lens L13.

The second lens group 2G includes, in order from the object side, a second F lens group 2FG and a second R lens group 2RG.

The second F lens group 2FG includes a positive lens element having a convex meniscus shape on the image side.

Figure 1:
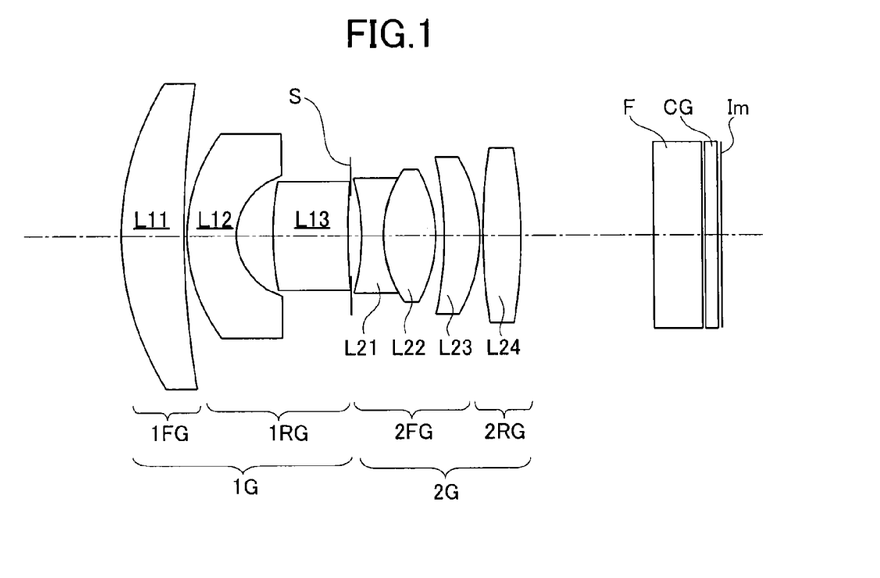
FIG. 1 is an optical layout diagram of an imaging-optical system according to Example 1.
Figure 2:
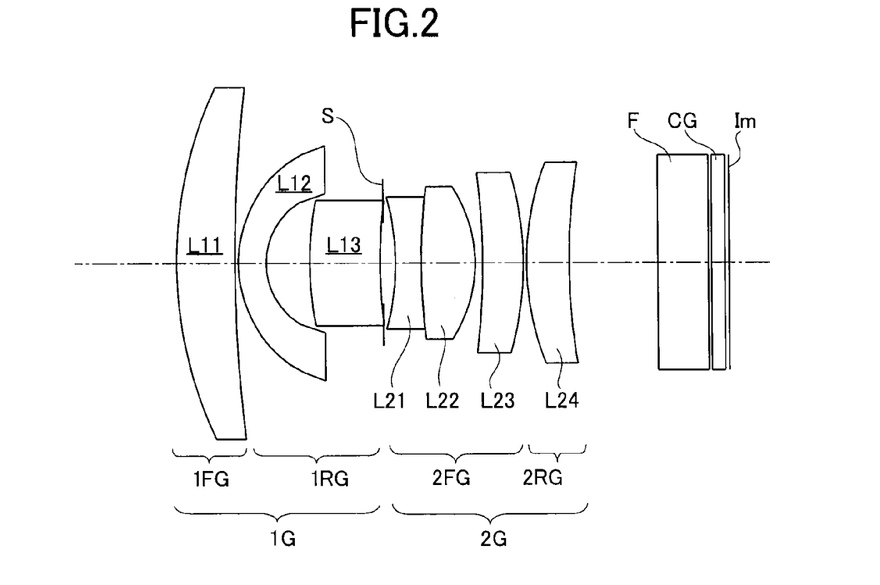
FIG. 2 is an optical layout diagram of an imaging-optical system according to Example 2.
Figure 4:
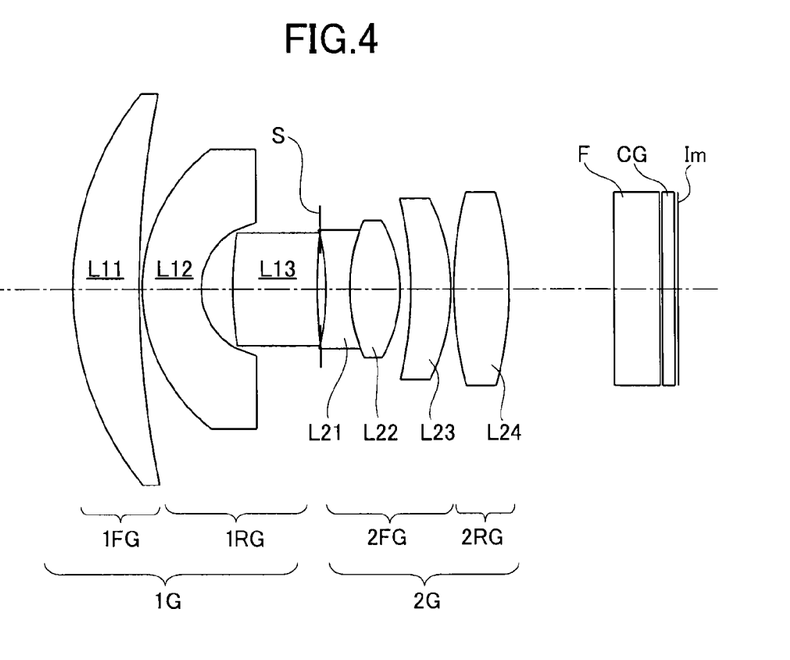
FIG. 4 is an optical layout diagram of an imaging-optical system according to Example 4.
Figure 5:
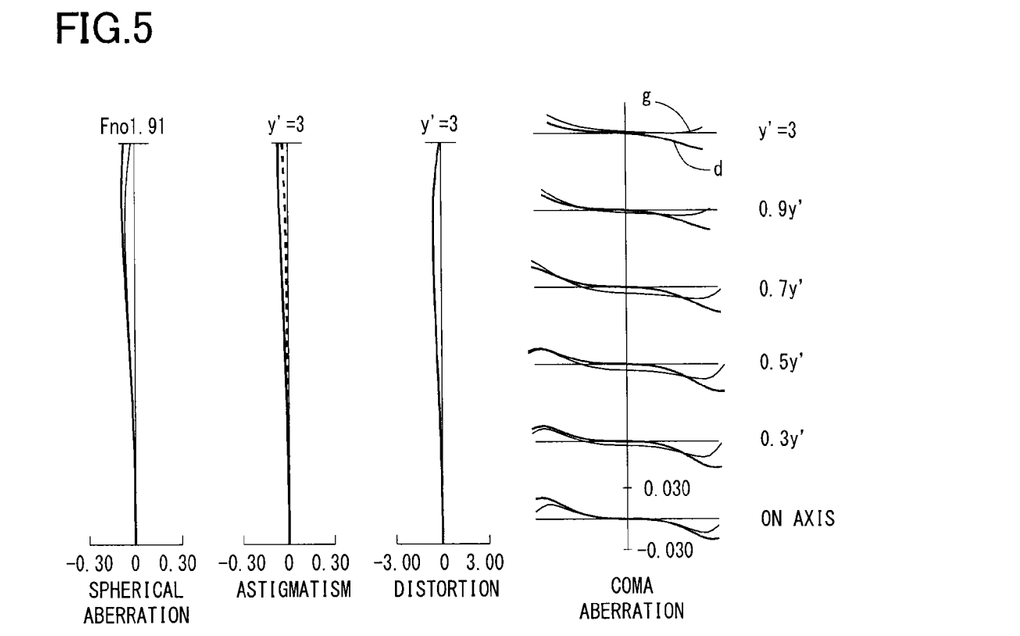
FIG. 5 is an aberration diagram for Example 1.
Figure 6:
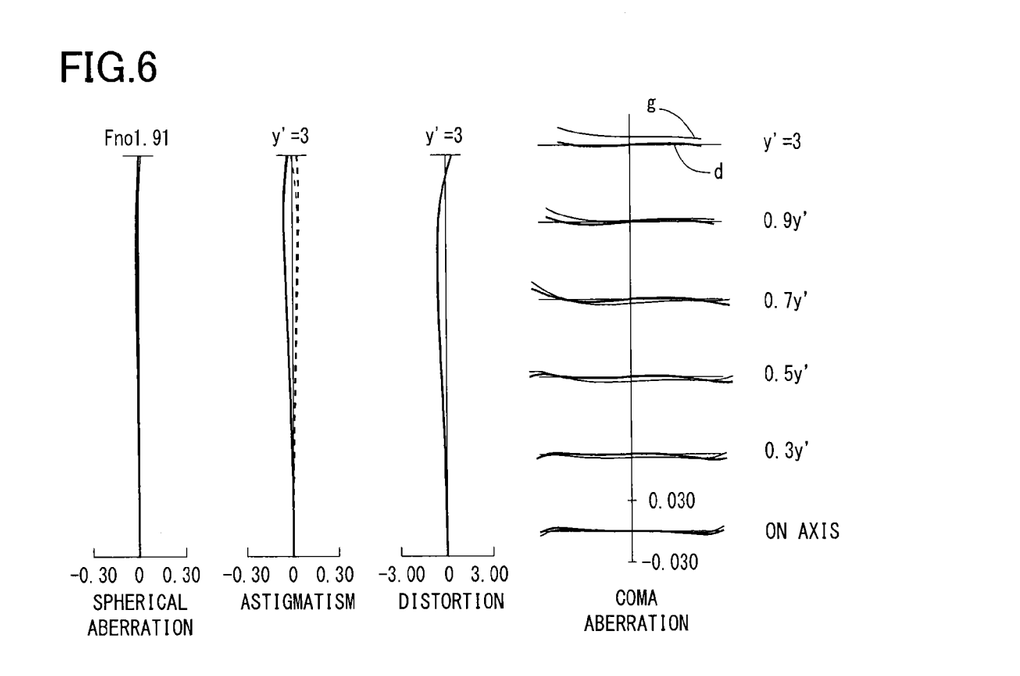
FIG. 6 is an aberration diagram for Example 2.
Figure 7:
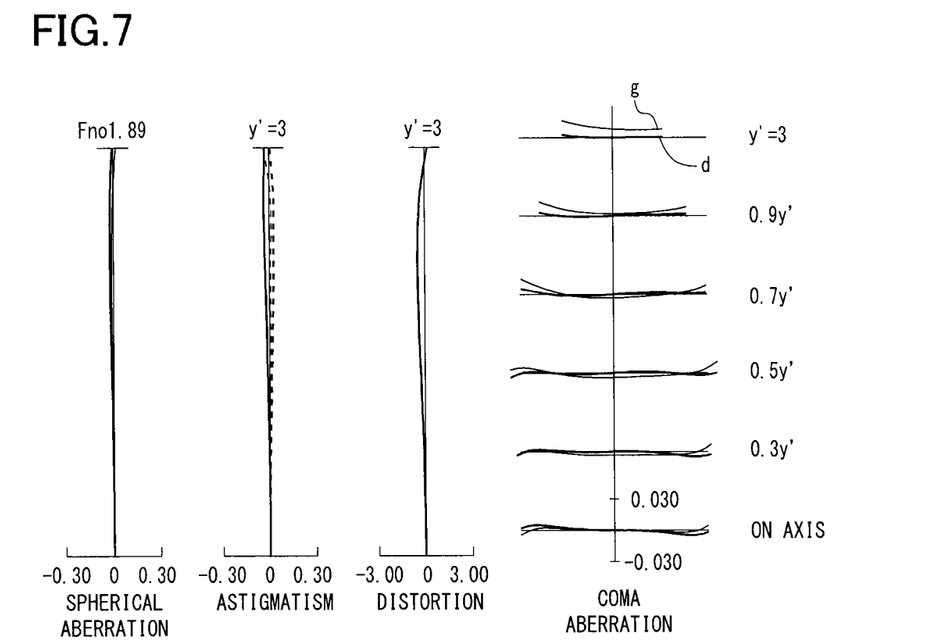
FIG. 7 is an aberration diagram for Example 3.
Figure 8:
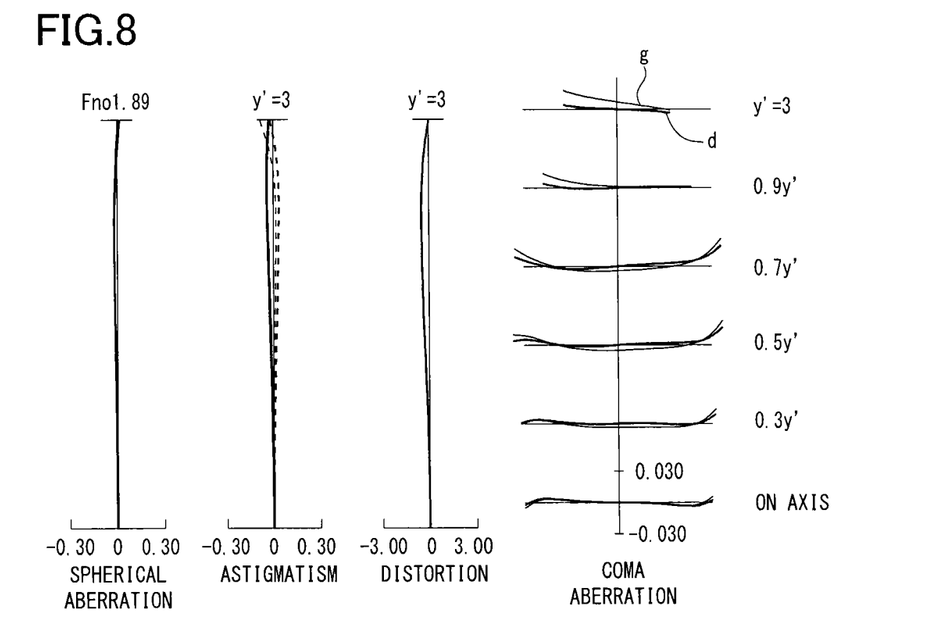
FIG. 8 is an aberration diagram for Example 4.

The positive lens element having the convex meniscus shape on the image side in the second F lens group 2FG corresponds to a positive meniscus lens L23 having a convex surface on the image side in Examples shown in FIG. 1, FIG. 2, and FIG. 4.

Figure 3:
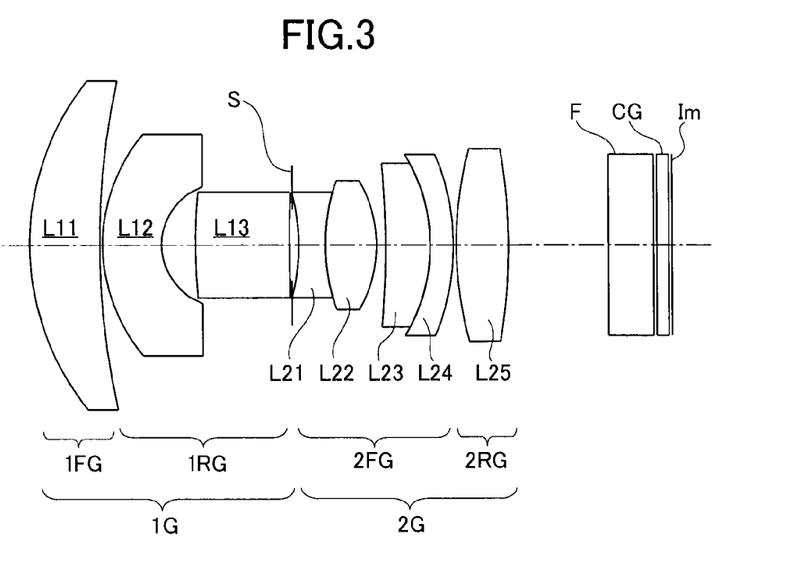
FIG. 3 is an optical layout diagram of an imaging-optical system according to Example 3.

In Example shown in FIG. 3, the positive lens element having the convex meniscus shape on the image side corresponds to a cemented lens including the positive meniscus lens L23 having the convex surface on the image side and a negative meniscus lens L24 having a convex surface on the image side.

These two meniscus lenses L23 and L24 are coupled by being cemented so as to configure the positive meniscus lens having the convex surface on the image side as a whole. That is, the meniscus lenses L23 and L24 configure the positive lens element having the convex meniscus shape on the image side.

Thus, the positive lens element in Embodiment 1 includes a cemented lens of two or more lenses as well as a single positive lens. The refractive power of the entire cemented lens is positive.

The imaging-optical system in Embodiment 1 is the retro focus type imaging-optical system having a negative power preceded on the object side.

Thus, as a result of applying the retro focus type imaging-optical system in which the negative power group is arranged on the object side and the positive power group is arranged on the image side, the increase of an incidence angle of the off-axis light to the image surface can be suppressed although the incidence angle is apt to increase according to the increase of the angle of view.

This effect is very important when an image is formed on a light-receiving surface of a light-receiving element of a CCD sensor, a CMOS sensor or the like by the imaging-optical system of Embodiment 1.

In addition to the above-described configuration, a triplet-type refractive power arrangement is realized by applying the configuration including the positive first F lens group 1FG, the negative first R lens group 1RG, the aperture stop S, and the second lens group 2G with a positive power as a whole. Thereby, difficulty level in the correction operation of the various types of aberrations including a chromatic aberration is reduced.

Particularly, an axial chromatic aberration can be controlled effectively by the configuration in which the negative first R lens group 1RG arranged adjacent to the aperture stop S is configured by two lenses of a negative lens and positive lens.

Since the lens L11 arranged on the most object side in the first lens group 1G is the positive meniscus lens having the convex surface on the object side, the spherical aberration which is apt to increase with the increase of the lens diameter can be controlled effectively.

In addition, the negative meniscus lens L12 having the convex surface on the object side in the first R lens group 1RG and the positive meniscus lens L23 (above-described positive lens element) having the convex surface on the image side in the second F lens group 2FG are arranged to form concave surfaces facing each other. Thereby, the spherical aberration can be corrected effectively.

According to the above-described configuration, the imaging-optical system of Embodiment 1 achieves a great advantage in the aberration correction. Also as shown in the later-described Examples, the imaging-optical system achieves a miniaturized body and a high performance in addition to obtaining the wide angle of view and the large diameter at some level.

It is preferable that the imaging-optical system of Embodiment 1 further satisfies one or more conditions of the following condition (1) to condition (4) under the above-described configuration.

$$0.05 < |f/R2mr| < 0.80 \quad (1)$$

$$0.15 < |f/fa| < 1.00 \quad (2)$$

$$0.15 < f/AL < 0.50 \quad (3)$$

$$0.50 < f2F/f < 2.50 \quad (4)$$

The reference characters of the parameters in these conditions (1) to (4) will be described as follows.

The reference character f indicates a focal length of the entire imaging-optical system. The reference character R2mr indicates a curvature radius on the object side surface of the positive lens element having the convex meniscus shape on the image side in the second F lens group 2FG.

As shown in FIG. 1 to FIG. 4, the most image-side surface of the first lens group 1G (the image-side surface of the lens L13) and the most object-side surface of the second lens group 2G (the object-side surface of the lens L21) configure a biconvex air lens through the aperture stop S).

The reference character fa indicates a focal length (<0) of the air lens.

The reference character AL indicates a distance from the most object-side surface of the first lens group 1G to the image surface on the optical axis under the condition in which the imaging-optical system focuses on infinity.

The reference character f2F indicates a focal length of the second F lens group 2FG.

The condition (1) defines the appropriate value for the object-side curvature radius of the positive lens element having the convex meniscus shape on the image side in the second F lens group 2FG in relation to a focal length f of the entire system.

When the parameter exceeds the upper limit in the condition (1), the curvature of the object-side concave surface of the positive lens element is increased. An air gap between the positive lens element and the object side lens L22 is therefore increased. As a result, an increase in the length of the imaging-optical system is often caused.

In addition, the aberration is excessively cancelled out between the negative meniscus lens L12 and the positive lens element in the first lens group 1G, and therefore, the sensitivity for performance degradation in relation to the manufacturing error might increase.

When the parameter falls below the lower limit in the condition (1), it becomes difficult to maintain the aberration-correction ability of the positive lens element, and the length of the imaging-optical system is increased.

The condition (2) defines the appropriate range for the focal length of the biconvex air lens in relation to the focal length f of the entire system.

When the parameter exceeds the upper limit in the condition (2), the curvature of both surfaces of the air lens increases, and the distances before and after the aperture stop S increased, thus the entire length of the optical system is extended.

In addition, the light-beam inclination angle on a refractive surface is easily increased excessively, and the sensitivity for performance deterioration in relation to the manufacturing error might increase.

When the parameter falls below the lower limit in the condition (2), the contribution of the air lens in the distortion correction becomes small. The entire length of the imaging-optical system is therefore increased.

The condition (3) defines the appropriate range for the entire length of the optical system AL in relation to the focal length f of the entire system.

Similar to the case using the imaging element, that is, the case in which the control of the incidence angle of the imaging light beam which enters into the image surface is emphasized, the optical arrangement of the imaging-optical system becomes similar to a front diaphragm type arrangement when the parameter exceeds the upper limit in the condition (3). Thus, the difficulty in the distortion correction mainly increases, and it becomes difficult to achieve the desired imaging performance.

When the parameter falls below the lower limit in the condition (3), the length of the optical system increases although it has advantageous in terms of aberration correction.

The condition (4) defines the appropriate range of the focal length of the second F lens group 2FG in relation to the focal length f of the entire system.

When the parameter exceeds the upper limit in the condition (4), the positive refractive power of the second F lens group 2FG relatively decreases. Therefore, it is required to increase the positive refractive power of the second R lens group 2RG so as to keep the positive refractive power of the entire second lens group 2G.

Therefore, the function of an exit pupil control performed by the second R lens group 2RG is deteriorated.

In addition, it becomes difficult to use effectively the ability for correcting the spherical aberration and the chromatic aberration which is exerted when the second F lens group 2FG and the negative lens L12 in the first lens group 1G are cooperated.

When the parameter falls below the lower limit in the condition (4), the aberration is excessively canceled out between the second F lens group 2FG and the first lens group 1G. Thus, it may increase the sensitivity for the performance deterioration in relation to the manufacturing error, and cause an increase in the length of the entire system of the imaging-optical system.

When each parameter in the conditions (1) to (4) satisfies the following conditions (1A) to (4A) which have parameters slightly smaller than those of the conditions (1) to (4), the effect provided by these conditions can be more beneficial.

$$0.10<|f/R2mr|<0.60 \quad (1A)$$

$$0.18<|f/fa|<0.75 \quad (2A)$$

$$0.20<f/AL<0.40 \quad (3A)$$

$$0.75<f2F/f<2.00 \quad (4A)$$

The imaging-optical system in Embodiment 1 has an appropriate configuration. That is, as described above, the configuration in which the imaging-optical system includes the biconvex air lens formed by the most-image side surface of the first lens group 1G and the most-object side surface of the second lens group 2G has significance as follows.

The distortion in the retro-focus type imaging-optical system in Embodiment 1 is apt to increase when it tries to realize the wider-angle.

The concave surfaces facing each other across the aperture stop S are formed by the biconvex air lens. Thereby, the balance of the distortion can be controlled, and the distortion can be corrected easily.

When the above-described conditions (2) and (2A) are satisfied, these functions of the air lens can be enhanced.

It is preferable that the air gap between the negative meniscus lens L12 having the convex surface on the object side and the positive lens L13 in the first R lens group 1RG in the first lens group 1G be the largest in the entire system of the imaging-optical system.

Such a configuration contributes effectively to the correction of the spherical aberration of the negative meniscus lens L12 which is the only one negative lens in the first lens group 1G. The spherical aberration is easily increased when the imaging-optical system is configured to have a larger diameter.

By arranging the negative meniscus lens L12 and the positive lens L13 to have a large air gap in between, the inclination angle of the light beam can be controlled so that the performance deterioration caused by the manufacturing error can be controlled effectively.

In addition, it is preferable that the second F lens group 2FG be configured to include at least one negative lens and at least one positive lens.

When the second F lens group 2FG includes at least one negative lens and positive lens, these lenses are cooperated with the negative meniscus lens L12 and the positive lens L13 in the first lens group 1G respectively, and thus the effect in the chromatic aberration correction increases significantly.

When one or more positive lenses is included in the second R lens group 2RG, the function for controlling the position of the exit pupil is added. Thereby, the incidence angle of the light beam toward the image surface can be controlled effectively.

When the total lenses configuring the imaging-optical system are made of a glass lens, the resistance properties to environmental change or the aging variation of the imaging-optical system can be improved.

When these glass lenses are configured by a spherical lens, a polishing process having a relatively small remaining internal stress can be performed at low cost. Therefore, the cost reduction in the imaging-optical system can be realized.

Of course, it is possible to configure the imaging-optical system of Embodiment 1 to include an aspheric lens in the lens configuration.

The imaging-optical system of Embodiment 1 is a retro-focus type system arranged to have the negative power preceded on the object side.

However, as shown in FIG. 1 to FIG. 4, the first F lens group 1FG on the most object side in the first lens group 1G is configured by the positive meniscus lens L11. The preceding negative power as the retro focus type system is provided by the negative meniscus lens L12 of the first R lens group 1RG.

Thus, it is not necessary to arrange the negative power to be on the most object side even in the retro-focus type optical system. Similarly, the first lens group 1G is not necessarily arranged to have the negative power.

The first lens group 10G is arranged to have a negative power as a whole, that is, the object side part from the aperture stop S is configured to have a negative power. With such a configuration, it becomes possible to take the light beam from the wide angle by a relatively small size.

Embodiment 2

Before describing the detailed Examples of the imaging-optical system, Embodiments of a stereo camera apparatus and an in-vehicle camera apparatus using the imaging-optical system will be described.

Figure 9:
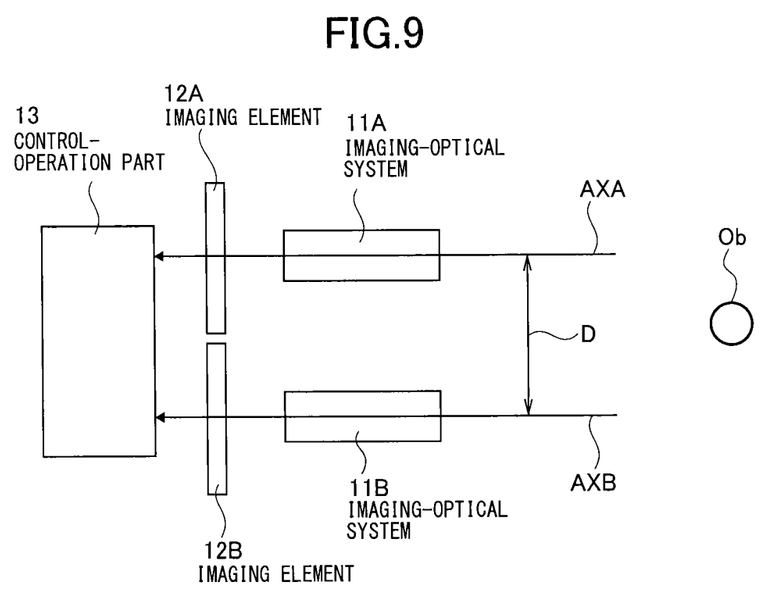
FIG. 9 is an explanatory diagram illustrating a stereo camera apparatus.

FIG. 9 is a schematic diagram illustrating a stereo camera apparatus of Embodiment 2. Since the stereo camera apparatus is already known, the following description is a brief account.

In FIG. 9, the reference characters 11A and 11B indicate an imaging-optical system having a similar configuration for each.

The imaging-optical system according to Examples 1 to 4 is appropriately used as the imaging-optical systems 11A and 11B.

The reference characters 12A and 12B indicate the imaging elements. For example, a CCD sensor or a CMOS sensor can be used as the imaging element.

The imaging-optical systems 11A and 11B are arranged such that an optical axis AXA and an optical axis AXB are arranged in parallel, and arranged to have a predetermined distance D (referred to as base-line length).

The imaging-optical system 11A forms an image of an object Ob on the light-receiving surface of the imaging element 12A.

The imaging-optical system 11B forms an image of the object Ob on the light-receiving surface of the imaging element 12B.

The imaging elements 12A and 12B input the image formed by the imaging-optical systems 11A and 11B to a control-operation part 13 as the photographed image data.

The control-operation part 13 configured by a computer or a CPU digitalizes the image information input from the imaging elements 12A and 12B.

Then, the distance to the object Ob is calculated according to the digitalized image information.

That is, as already known, the control-operation part 13 calculates the distance between each image position D+Δ according to the image position of the object Ob to be formed on each imaging element 12A and 12B.

When the focal length of the imaging-optical system is f and the base-line length is D, the distance d to the object Ob can be calculated by the following expression by using the D+Δ obtained as above:

$$d = f\{1+(D/\Delta)\}$$

Thus, the above calculation is the distance measurement process performed by the stereo camera apparatus.

Embodiment 3

Figure 10:
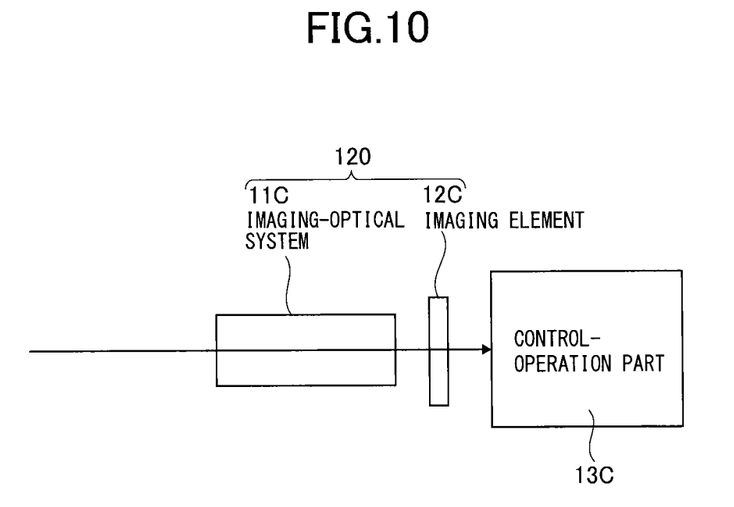
FIG. 10 is an explanatory diagram illustrating an in-vehicle camera apparatus.

FIG. 10 is a schematic diagram of an in-vehicle camera apparatus of Embodiment 3.

In FIG. 10, the reference character 120 indicates an imaging system, and the reference character 13C indicates a control-operation part.

The imaging system 120 includes an imaging-optical system 11C and an imaging element 12C. The imaging system 120 and the control-operation part 13C configure the in-vehicle camera apparatus mounted on a not-shown vehicle. For example, image information outside a vehicle is obtained and digitalized by the in-vehicle camera apparatus.

The imaging-optical system according to Examples 1 to 4 is appropriately used as the imaging-optical system 11C.

The imaging system 120 and the control-operation part 13C shown in FIG. 10 can be replaced by the stereo camera apparatus shown in FIG. 9.

That is, the stereo camera apparatus shown in FIG. 9 can be mounted on the vehicle as the in-vehicle camera apparatus.

EXAMPLES

Hereinafter, four detailed Examples of the imaging-optical system will be described.

The reference characters in the Examples represent the following.

f: focal length of entire system
Fno: F-number
ω: half angle of view
Y': maximum image height
R: curvature radius
D: distance between surfaces
Nd: refractive index on d-line
vd: Abbe number
BF: back focus The "glass type" represents a glass material for a lens. All lenses used in the Examples are manufactured by OHARA INC. The product name provided by OHARA INC. is used in the data.

Herein, a unit of length is "mm" unless otherwise noted.

In addition, "each type of filter" indicated in the data represents one or more filters of infrared-cut filters or the like as a transparent-parallel plane which is optically equivalent to the filter.

Example 1 which is described firstly is a detailed example of a configuration of an imaging-optical system shown in FIG. 1. That is, the imaging-optical system according to Example 1 has the configuration in which a first lens group 1G, an aperture stop S, and a second lens group 2G are arranged in order from an object side to an image side, as shown in FIG. 1.

The first lens group 1G includes, in order from the object side, a positive meniscus lens L11 having a convex surface on the object side, a negative meniscus lens L12 having a convex surface on the object side, and a positive meniscus lens L13 having a convex surface on the object side.

The positive meniscus lens L11 configures a first F lens group 1FG, and the negative meniscus lens L12 and the positive meniscus lens L13 configure a first R lens group 1RG.

The second lens group 2G includes, in order from the object side, a second F lens group 2FG configured by a cemented lens including a biconcave lens L21 and biconvex lens L22 and configured by a positive meniscus lens L23 having a concave surface on the object side, and a second R lens group 2RG configured by a biconvex lens L24.

Therefore, the imaging-optical system in Example 1 is configured by the seven lenses.

Example 1

| f = 5.35, Fno = 1.91, ω = 29.26 | | | | |
|---|---|---|---|---|
| SURFACE NUMBER | R | D | Nd | v d | TYPES OF GLASS |
| 1 | 10.13700 | 2.00 | 1.76200 | 40.10 | S-LAM55 |
| 2 | 32.80000 | 0.10 | | | |
| 3 | 5.90000 | 1.57 | 1.72916 | 54.68 | S-LAL18 |
| 4 | 2.13300 | 1.18 | | | |
| 5 | 10.35000 | 2.40 | 1.72151 | 29.23 | S-TIH18 |
| 6 | 25.00000 | 0.10 | | | |
| 7 | APERTURE STOP | 0.35 | | | |
| 8 | −7.23200 | 0.70 | 1.75520 | 27.51 | S-TIH4 |
| 9 | 4.02500 | 1.694 | 1.71300 | 53.87 | S-LAL8 |
| 10 | −4.70000 | 0.28 | | | |

-continued f = 5.35, Fno = 1.91, ω = 29.26

| SURFACE NUMBER | R | D | Nd | νd | TYPES OF GLASS |
|---|---|---|---|---|---|
| 11 | −12.55200 | 1.15 | 1.77250 | 49.60 | S-LAH66 |
| 12 | −5.51700 | 0.10 | | | |
| 13 | 21.00000 | 1.22 | 1.67790 | 55.34 | S-LAL12 |
| 14 | −18.00000 | 4.27 | | | |
| 15 | ∞ | 1.541 | 1.51633 | 64.14 | EACH TYPE OF FILTER |
| 16 | ∞ | 0.10 | | | |
| 17 | ∞ | 0.4 | 1.51633 | 64.14 | COVER GLASS |
| 18 | ∞ | BF | | | |

Parameter values in the conditions are as follows.
(1) 0.426
(2) 0.413
(3) 0.277
(4) 1.244

The following Example 2 is a detailed example of a configuration of an imaging-optical system shown in FIG. 2.

That is, the imaging-optical system according to Example 2 has a configuration in which a first lens group 1G, an aperture stop S, and a second lens group 2G are arranged from an object side to an image side, as shown in FIG. 2.

The first lens group 1G includes, in order from the object side, a positive meniscus lens L11 having a convex surface on the object side, a negative meniscus lens L12 having a convex surface facing the object side, and a positive meniscus lens L13 having a convex surface on the object side.

The positive meniscus lens L11 configures a first F lens group 1FG, and the negative meniscus lens L12 and the positive meniscus lens L13 configure a first R lens group 1RG.

The second lens group 2G includes, in order from the object side, a second F lens group 2FG configured by a cemented lens including a biconcave lens L21 and a biconvex lens L22 and a positive meniscus lens L23 having a concave surface on the object side, and a second R lens group 2RG configured by a positive meniscus lens L24 having a convex surface on the object side.

Therefore, the imaging-optical system according to Example 2 is configured by the seven lenses.

Example 2 f = 5.35, Fno = 1.91, ω = 29.13

| SURFACE NUMBER | R | D | Nd | νd | TYPES OF GLASS |
|---|---|---|---|---|---|
| 1 | 11.50200 | 1.785 | 1.88300 | 40.76 | S-LAH58 |
| 2 | 42.80600 | 0.100 | | | |
| 3 | 3.53500 | 0.861 | 1.72916 | 54.68 | S-LAL18 |
| 4 | 2.03800 | 1.336 | | | |
| 5 | 9.25300 | 2.169 | 1.71736 | 29.52 | S-TIH1 |
| 6 | 13.28100 | 0.100 | | | |
| 7 | APERTURE STOP | 0.385 | | | |
| 8 | −6.75400 | 0.800 | 1.92286 | 18.90 | S-NPH2 |
| 9 | 17.21700 | 1.672 | 1.78800 | 47.37 | S-LAH64 |
| 10 | −3.83300 | 0.227 | | | |
| 11 | −19.86700 | 1.250 | 1.81600 | 46.62 | S-LAH59 |
| 12 | −8.70000 | 0.10 | | | |
| 13 | 7.54400 | 1.321 | 1.81600 | 46.62 | S-LAH59 |

-continued f = 5.35, Fno = 1.91, ω = 29.13

| SURFACE NUMBER | R | D | Nd | νd | TYPES OF GLASS |
|---|---|---|---|---|---|
| 14 | 17.27900 | 2.724 | | | |
| 15 | ∞ | 1.541 | 1.51633 | 64.14 | EACH TYPE OF FILTER |
| 16 | ∞ | 0.100 | | | |
| 17 | ∞ | 0.4 | 1.51633 | 64.14 | COVER GLASS |
| 18 | ∞ | BF | | | |

Parameter values in the conditions are as follows.
(1) 0.269
(2) 0.544
(3) 0.315
(4) 1.179

The following Example 3 is a detailed example of a configuration of an imaging-optical system shown in FIG. 3.

That is, the imaging optical system according to Example 3 has a configuration in which a first lens group 1G, an aperture stop S, and a second lens group 2G are arranged from an object side to an image side as shown in FIG. 3.

The first lens group 1G includes, in order from the object side, a positive meniscus lens L11 having the convex surface on the object side, a negative meniscus lens L12 having the convex surface on the object side, and a positive meniscus lens L13 having the convex surface on the object side.

The positive meniscus lens L11 configures a first F lens group 1FG, and the negative meniscus lens L12 and the positive meniscus lens L13 configure a first R lens group 1RG.

The second lens group 2G includes a second F lens group 2FG on the object side and a second R lens group 2RG on the image side.

The second F lens group 2FG includes, in order from the object side, a cemented lens including a biconcave lens L21 and a biconvex lens L22, and a cemented lens including a positive meniscus lens L23 and a negative meniscus lens L24, the cemented lens having a concave surface on the object side.

The second R lens group 2RG is configured by a biconvex lens L25.

Therefore, the imaging-optical system according to Example 3 is configured by the eight lenses.

Example 3 f = 5.35, Fno = 1.89, ω = 29.27

| SURFACE NUMBER | R | D | Nd | νd | TYPES OF GLASS |
|---|---|---|---|---|---|
| 1 | 9.12500 | 2.400 | 1.76200 | 40.10 | S-LAM55 |
| 2 | 26.64300 | 0.100 | | | |
| 3 | 5.94700 | 2.000 | 1.81600 | 46.62 | S-LAH59 |
| 4 | 2.16900 | 1.148 | | | |
| 5 | 19.06300 | 3.200 | 1.92286 | 18.90 | S-NPH2 |
| 6 | 57.49500 | 0.100 | | | |
| 7 | APERTURE STOP | 0.211 | | | |
| 8 | −7.27600 | 0.921 | 1.80809 | 22.76 | S-NPH1 |
| 9 | 6.59100 | 1.748 | 1.69680 | 55.53 | S-LAL14 |
| 10 | −4.41900 | 0.316 | | | |
| 11 | −31.18300 | 1.531 | 1.76200 | 40.10 | S-LAM55 |

-continued

| f = 5.35, Fno = 1.89, ω = 29.27 | | | | | |
|---|---|---|---|---|---|
| SURFACE NUMBER | R | D | Nd | ν d | TYPES OF GLASS |
| 12 | −6.02200 | 0.800 | 1.59270 | 35.31 | S-FTM16 |
| 13 | −8.09500 | 0.100 | | | |
| 14 | 12.35800 | 1.800 | 1.67790 | 55.34 | S-LAL12 |
| 15 | −19.77800 | 3.395 | | | |
| 16 | ∞ | 1.541 | 1.51633 | 64.14 | EACH TYPE OF FILTER |
| 17 | ∞ | 0.100 | | | |
| 18 | ∞ | 0.4 | 1.51633 | 64.14 | COVER GLASS |
| 19 | ∞ | BF | | | |

Parameter values of the conditions are as follows.
(1) 0.172
(2) 0.380
(3) 0.243
(4) 1.301

Example 4 described lastly is a detailed example of a configuration of an imaging-optical system shown in FIG. 4. That is, the imaging-optical system according to Example 4 has a configuration in which a first lens group 1G, an aperture stop S, and a second lens group 2G are arranged in order from an object side to an image side as shown in FIG. 4.

The first lens group 1G includes, in order from the object side, a positive meniscus lens L11 having a convex surface on the object side, a negative meniscus lens L12 having a convex surface on the object side, and a positive meniscus lens L13 having the convex surface on the object side.

The positive meniscus lens L11 configures a first F lens group 1FG, and the negative meniscus lens L12 and the positive meniscus lens L13 configure a first R lens group 1RG.

The second lens group 2G includes, in order from the object side, a second F lens group 2FG configured by a cemented lens including a biconcave lens L21 and a biconvex lens L22 and a positive meniscus lens L23 having a concave surface on the object side, and a second R lens group 2RG configured by a biconvex lens L24.

Therefore, the imaging-optical system according to Example 4 is configured by the seven lenses.

Example 4

| f = 5.35, Fno = 1.89, ω = 29.23 | | | | | |
|---|---|---|---|---|---|
| SURFACE NUMBER | R | D | Nd | ν d | TYPES OF GLASS |
| 1 | 9.67200 | 2.259 | 1.76200 | 40.10 | S-LAM55 |
| 2 | 30.85300 | 0.100 | | | |
| 3 | 5.61700 | 1.963 | 1.81600 | 46.62 | S-LAH59 |
| 4 | 2.17100 | 1.065 | | | |
| 5 | 10.82800 | 2.859 | 1.80518 | 25.42 | S-TIH6 |
| 6 | 17.42100 | 0.100 | | | |
| 7 | APERTURE STOP | 0.199 | | | |
| 8 | −7.37700 | 0.800 | 1.80518 | 25.42 | S-TIH6 |
| 9 | 5.47000 | 1.711 | 1.65160 | 58.55 | S-LAL7 |
| 10 | −4.24900 | 0.351 | | | |
| 11 | −12.26600 | 1.380 | 1.77250 | 49.60 | S-LAH66 |
| 12 | −6.30100 | 0.100 | | | |
| 13 | 11.74900 | 1.885 | 1.67790 | 55.34 | S-LAL12 |

-continued

| f = 5.35, Fno = 1.89, ω = 29.23 | | | | | |
|---|---|---|---|---|---|
| SURFACE NUMBER | R | D | Nd | ν d | TYPES OF GLASS |
| 14 | −10.93300 | 3.529 | | | |
| 15 | ∞ | 1.541 | 1.51633 | 64.14 | EACH TYPE OF FILTER |
| 16 | ∞ | 0.100 | | | |
| 17 | ∞ | 0.4 | 1.51633 | 64.14 | COVER GLASS |
| 18 | ∞ | BF | | | |

Parameter values of the conditions are as follows.
(1) 0.436
(2) 0.468
(3) 0.260
(4) 1.598

Aberration diagrams in relation to Examples 1 to 4 are shown in FIG. 5 to FIG. 8.

In an astigmatism diagram in the aberration diagram, a solid line represents a sagittal and a broken line represents a meridional.

In addition, the reference character d corresponds to an aberration diagram of a d-line of spectrum, and the reference character g corresponds to an aberration diagram of a g-line of spectrum.

As is obvious with these aberration diagrams, the aberration in each Example is sufficiently corrected, and a high-performance is therefore achieved.

The imaging-optical system according to these Examples has a wide angle of view having a half angle of view of about 29 degrees, and has a large diameter having an F-number of about 2 or less.

In addition, the imaging-optical system is miniaturized because it is configured by the seven to eight lenses, whereas the distortion thereof is sufficiently small.

The imaging-optical system according to each Example forms the image of the object on the light-receiving surface of the imaging element.

The type of the imaging element used together with the imaging optical system according to Examples is not particularly limited. Since the distortion is sufficiently corrected and an extremely preferable performance is achieved in the imaging-optical system according to each Example 1 to 4, the imaging-optical system can perform sufficiently when it is used with the imaging element having a significantly high-SXGA resolution.

Of course, the imaging-optical system according to the present invention is not always limited to those described in the above Embodiments or Examples.

In addition, the imaging-optical system according to Embodiment 1 of the present invention can be used as an imaging-optical system for a silver-salt film camera. Similarly, the imaging-optical system can be mounted on a digital camera, a hand-held terminal device, a video apparatus, an optical sensor, a projector or the like, for use.

As described above, according to Embodiments of the present invention, an imaging-optical system, a stereo camera apparatus, and an in-vehicle camera apparatus as follows can be realized.

[1]

A retro-focus type imaging-optical system comprising, in order from an object side to an image side: a first lens group; an aperture stop; and a second lens group, wherein the first lens group includes, in order from the object side, a positive first F lens group and a negative first R lens group, the first F lens group includes a positive meniscus lens having a convex surface on the object side, the first R lens group includes a negative meniscus lens having a convex surface on the object side and a positive lens, the second lens group includes, in order from the object side, a positive second F lens group and a second R lens group, and the second F lens group includes a positive lens element having a convex meniscus shape on the image side.

[2]

The imaging-optical system as described in the above [1], wherein a focal length f of an entire system of the imaging-optical system, and a curvature radius R2$mr$ of an object-side surface of the positive lens element having the convex meniscus lens shape on the image side in the second F lens group satisfy the following condition:

$$0.05 < |f/R2mr| < 0.80 \qquad (1)$$

[3]

The imaging-optical system as described in the above [1] or [2], wherein an air lens configured by a most image-side surface of the first lens group and a most object-side surface of the second lens group has a biconvex configuration.

[4]

The imaging-optical system as described in any one of the above [1] to [3], wherein a focal length f of an entire system of the imaging-optical system and a focal length fa of an air lens configured by a most image-side surface of the first lens group and a most object-side surface of the second lens group satisfy the following condition:

$$0.15 < |f/fa| < 1.00 \qquad (2)$$

[5]

The imaging-optical system as described in any one of the above [1] to [4], wherein an air gap between the negative meniscus lens having the convex surface on the object side and the positive lens in the first R lens group in the first lens group is the largest in the entire system of the imaging-optical system.

[6]

The imaging-optical system as described in any one of the above [1] to [5], wherein a focal length f of an entire system of the imaging-optical system and a distance AL on an optical axis between a most object-side surface of the first lens group and an image surface when focused on an infinity satisfy the following condition:

$$0.15 < f/AL < 0.50 \qquad (3)$$

[7]

The imaging-optical system as described in any one of the above [1] to [6], wherein the second F lens group which is arranged on the object side in the second lens group includes at least one negative lens and at least one positive lens.

[8]

The imaging-optical system as described in any one of the above [1] to [7], wherein a focal length f of an entire system of the imaging-optical system and a focal length f2F of the second F lens group satisfy the following condition:

$$0.50 < f2F/f < 2.50 \qquad (4)$$

[9]

The imaging-optical system as described in any one of the [1] to [8], wherein all lenses configuring the first lens group and the second lens group are made of a glass spherical lens.

[10]

A stereo camera apparatus comprising the imaging-optical system as described in any one of the above [1] to [9].

[11]

An in-vehicle camera apparatus comprising the imaging-optical system as described in any one of the above [1] to [9].

[12]

An in-vehicle camera apparatus comprising the stereo camera apparatus as described in the above [10].

[13]

The stereo camera apparatus as described in the above [10] comprising an operation part which digitalizes image information of an image photographed by the imaging-optical system.

[14]

The in-vehicle camera apparatus as described in the above [11] or [12] comprising an operation part which digitalizes image information of an image photographed by the imaging-optical system.

According to Embodiments of the present invention, a new imaging-optical system with a high performance in which an increase in the length of the imaging-optical system is prevented effectively can be realized.

Although Embodiments of the present invention have been described above, the present invention is not limited thereto. It should be appreciated that variations may be made in the embodiments described by persons skilled in the art without departing from the scope of the present invention.

What is claimed is:

1. A retro-focus type imaging-optical system comprising, in order from an object side to an image side:
   a first lens group;
   an aperture stop; and
   a second lens group, wherein
   the first lens group includes, in order from the object side, a positive first F lens group and a negative first R lens group,
   the first F lens group consists of a positive meniscus lens having a convex surface on the object side,
   the first R lens group consists of a negative meniscus lens having a convex surface on the object side and a positive lens,
   the second lens group includes, in order from the object side, a positive second F lens group and a second R lens group,
   the second F lens group includes a positive meniscus lens having a convex surface on the image side, and
   an air gap is provided between the negative meniscus lens having the convex surface on the object side and the positive lens of the first R group in the first lens group such that there is no intervening lens therebetween said air gap being a largest air gap in the imaging-optical system.

2. The imaging-optical system according to claim 1, wherein
   a focal length f of an entire system of the imaging-optical system, and a curvature radius R2$mr$ of an object-side surface of the positive lens having the convex meniscus lens shape on the image side in the second F lens group satisfy the following condition:

$$0.05 < |f/R2mr| < 0.80 \qquad (1)$$

3. The imaging-optical system according to claim 1, wherein
   an air lens configured by a most image-side surface of the first lens group and a most object-side surface of the second lens group has a biconvex configuration.

4. The imaging-optical system according to claim 1, wherein a focal length f of an entire system of the imaging-optical system and a focal length fa of an air lens configured by a most image-side surface of a lens of the first lens group and a most object-side surface of a lens of the second lens group satisfy the following condition:

$$0.15<|f/fa|<1.00 \qquad (2)$$

5. The imaging-optical system according to claim 1, wherein
a focal length f of an entire system of the imaging-optical system and a distance AL on an optical axis between a most object-side surface of the first lens group and an image surface when focused on an infinity satisfy the following condition:

$$0.15<f/AL<0.50 \qquad (3)$$

6. The imaging-optical system according to claim 1, wherein
the second F lens group which is arranged on the object side in the second lens group includes at least one negative lens and at least one positive lens.

7. The imaging-optical system according to claim 1, wherein
a focal length f of an entire system of the imaging-optical system and a focal length f2F of the second F lens group satisfy the following condition:

$$0.50<f2F/f<2.50 \qquad (4)$$

8. The imaging-optical system according to claim 1, wherein
all lenses configuring the first lens group and the second lens group are made of a glass spherical lens.

9. A stereo camera apparatus comprising the imaging-optical system according to claim 1.

10. An in-vehicle camera apparatus comprising the stereo camera system according to claim 9.

11. The stereo camera apparatus according to claim 9 comprising an operation part which digitalizes image information of an image photographed by the imaging-optical system.

12. An in-vehicle camera apparatus comprising the imaging-optical system according to claim 1.

13. The in-vehicle camera apparatus according to claim 12 comprising an operation part which digitalizes image information of an image photographed by the imaging-optical system.

14. The imaging-optical system according to claim 1, wherein
a focal length f of an entire system of the imaging-optical system, and a curvature radius R2mr of an object-side surface of the positive lens having the convex meniscus lens shape on the image side in the second F lens group satisfy a following condition:

$$0.05<|f/R2mr|<0.80 \qquad (1), \text{ and}$$

an air lens configured by a most image-side surface of a lens of the first lens group and a most object-side surface of a lens of the second lens group has a biconvex configuration.

15. The imaging-optical system according to claim 1, wherein
a focal length f of an entire system of the imaging-optical system, and a curvature radius R2mr of an object-side surface of the positive lens having the convex meniscus lens shape on the image side in the second F lens group satisfy a following condition:

$$0.05<|f/R2mr|<0.80 \qquad (1), \text{ and}$$

the focal length f of the entire system of the imaging-optical system and a focal length fa of an air lens configured by a most image-side surface of a lens of the first lens group and a most object-side surface of a lens of the second lens group satisfy a following condition:

$$0.15<|f/fa|<1.00 \qquad (2)$$

16. The imaging-optical system according to claim 1, wherein
a focal length f of an entire system of the imaging-optical system, and a curvature radius R2mr of an object-side surface of the positive lens having the convex meniscus lens shape on the image side in the second F lens group satisfy a following condition:

$$0.05<|f/R2mr|<0.80 \qquad (1)$$

an air lens configured by a most image-side surface of a lens of the first lens group and a most object-side surface of a lens of the second lens group has a biconvex configuration, and
the focal length f of the entire system of the imaging-optical system and a focal length fa of the air lens configured by the most image-side surface of the lens of the first lens group and the most object-side surface of the lens of the second lens group satisfy a following condition:

$$0.15<|f/fa|<1.00 \qquad (2)$$

17. The imaging-optical system according to claim 1, wherein
an air lens configured by a most image-side surface of a lens of the first lens group and a most object-side surface of a lens of the second lens group has a biconvex configuration, and
a focal length f of an entire system of the imaging-optical system and a focal length fa of the air lens configured by the most image-side surface of the lens of the first lens group and the most object-side surface of the lens of the second lens group satisfy a following condition:

$$0.15<|f/fa|<1.00 \qquad (2)$$

18. The imaging-optical system according to claim 3, wherein
a focal length f of an entire system of the imaging-optical system, and a curvature radius R2mr of an object-side surface of the positive lens having the convex meniscus lens shape on the image side in the second F lens group satisfy a following condition:

$$0.05<|f/R2mr|<0.80 \qquad (1).$$

19. The imaging-optical system according to claim 1, wherein
a focal length f of an entire system of the imaging-optical system, and a curvature radius R2mr of an object-side surface of the positive lens having the convex meniscus lens shape on the image side in the second F lens group satisfy a following condition:

$$0.05<|f/R2mr|<0.80 \qquad (1), \text{ and}$$

the focal length f of the entire system of the imaging-optical system and a distance AL on an optical axis between a most object-side surface of the first lens group and an image surface when focused on an infinity satisfy a following condition:

$$0.15<f/AL<0.50 \qquad (3)$$

20. The imaging-optical system according to claim 1, wherein the second F lens group further includes a cemented lens including a biconcave lens and biconvex lens which is closer to the object side than the positive meniscus lens having the convex surface on the image side.

* * * * *